United States Patent

Twine

[15] 3,698,611

[45] Oct. 17, 1972

[54] WEB FEEDING APPARATUS

[72] Inventor: Kenneth Frederick C. Twine, Uxbridge, England

[73] Assignee: International Computers Limited, Putney, London, England

[22] Filed: Nov. 4, 1970

[21] Appl. No.: 86,869

[30] Foreign Application Priority Data

Nov. 6, 1969 Great Britain..........54,402/69

[52] U.S. Cl......................................226/50, 226/114

[51] Int. Cl. ............................................B65h 17/42

[58] Field of Search..........226/113, 114, 49, 50, 186, 226/187; 274/4 D

[56] References Cited

UNITED STATES PATENTS 3,136,465 6/1964 Comstock.............226/113 X 3,568,905 3/1971 Napfel........................226/50

*Primary Examiner*—Richard A. Schacher

*Attorney*—Keith Misegades and George R. Douglas, Jr.

[57] ABSTRACT

Apparatus for feeding a web of recorded medium such as plastic or paper tape has a capstan roller for feeding a web past a read/write station in a first direction and a device is positioned upstream of the station automatically to form a loop in the web when the capstan roller is disengaged from the web to move a fixed length of the web in a reverse direction past the station to permit reading or re-recording of the information on the web.

2 Claims, 1 Drawing Figure

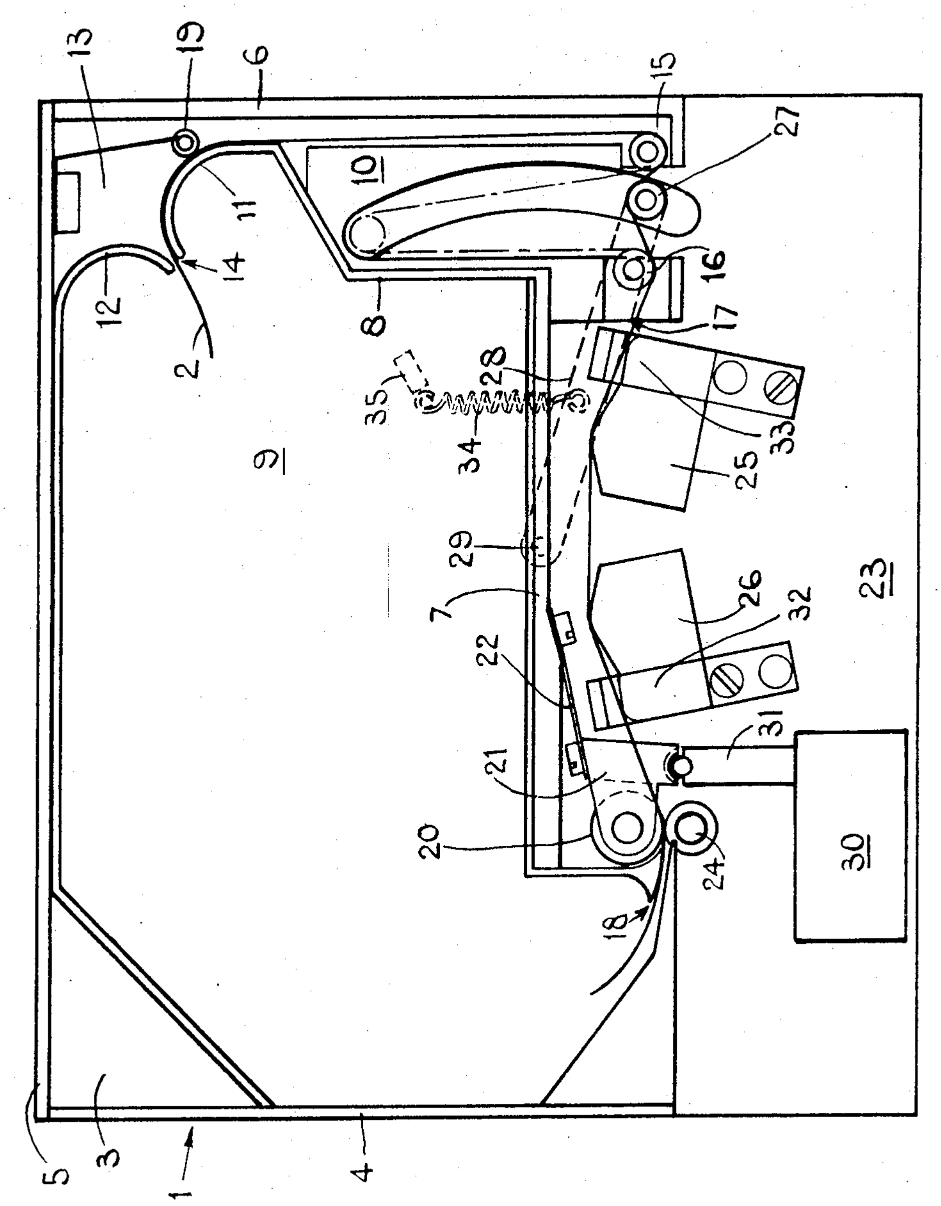
1
2
3
4
5
6
7
8
9
10
11
12
13
14
15
16
17
18
19
20
21
22
23
24
25
26
27
28
29
30
31
32
33
34
35

WEB FEEDING APPARATUS

BACKGROUND OF THE INVENTION

The present invention relates to apparatus for feeding webs.

In web feeding apparatus it is sometimes desirable to be able to feed the web in a reverse direction to the normal feed direction and it is known to accomplish this by providing two capstans each selectively operable to feed the web in an opposite direction. Such reverse feed is required in, for example, magnetic tape systems to permit a second passage of a portion of recorded tape past the magnetic head in order to read information which has just been recorded on the tape. The provision of two capstans adds to the complexity and cost of the apparatus and also requires the provision of controls to ensure that the required length of web is fed in the reverse direction.

SUMMARY OF THE INVENTION

According to the invention apparatus for feeding a web of record medium includes means operable in a first mode for feeding the web along a path in a first direction; means positioned at a point along the path and operable to form a loop of a fixed length of the web; the feeding means being operable in a second mode in which the web which has passed said point is allowed to move in a direction opposite to the first direction with a frictional restraint less than that exerted on the web which has not passed the point such that the loop is formed of web which has passed the point.

BRIEF DESCRIPTION OF THE DRAWING

Apparatus embodying the invention will now be described with reference to the accompanying drawing which shows in plan view a tape cassette mounted on a tape deck.

DESCRIPTION OF THE PREFERRED EMBODIMENT

Referring to the drawing a cassette 1 for an endless loop of magnetic tape 2 has a bottom plate 3 and side walls 4, 5, 6 and 7. A top plate (not shown) is secured to the side walls such that it extends parallel to the bottom plate 3 and is spaced therefrom by a distance slightly greater than the width of the tape 2 contained in the cassette 1. The cassette 1 is divided by a partition 8 to provide a main tape reservoir 9 and a smaller secondary reservoir 10. Two curved guide members 11 and 12 are provided adjacent a corner 13 of the tape cassette to form an outlet throat 14 for the exit of tape from the main reservoir 9 into the secondary reservoir 10. The tape is guided from the throat 14 by the convex curved surface of guide 11 and then by a pair of guide rollers 15 and 16 to a tape outlet 17. The tape re-enters the cassette through an inlet throat 18 into the main reservoir 9 diagonally opposite the throat 14. A pressure roller 19 is provided to exert a restraining force on the tape 2 in contact with the guide 11. A pinch roller 20 is carried on the exterior of the cassette by means of a carrier 21 resiliently secured to the side wall 7 by means of a leaf spring 22. The pinch roller 20 is located immediately adjacent the inlet throat 18. The tape is contained in the main reservoir 9 in the form of a number of loose loops supported on edge by the bottom plate 3.

In order to read information from the tape, or to record information on the tape, the cassette 1 is removably secured on the base plate 23 of a tape deck such that a continuously driven capstan roller 24 on the base plate 23 co-operates with the pinch roller 20 to engage the tape 2 so as to draw the tape from the outlet 17 past a write head 25 and a read head 26 and to drive the tape back into the cassette through the inlet throat 18. The tape deck is provided with a freely rotatable roller 27 mounted on the free end of an arm 28 pivoted at 29 to the lower face of the base plate 23 of the tape deck. The roller 27 projects through an arcuate slot in the base plate 23 and a slot in the bottom plate 23 of the secondary reservoir. The slot in the bottom plate 3 is shaped to be somewhat wider at its open end than the slot in the base plate 23 to facilitate fitting and removing of the cassette to and from the tape deck. The roller 27 engages the tape between the guide rollers 15 and 16.

An electromagnetic actuator 30 on the base plate 23 has a push rod 31 which is engageable with the carrier 21 of the pinch roller. Stationary guides 32 and 33 are provided on the deck to guide the tape over the heads 25 and 26.

When the actuator 30 is de-energized, the pinch roller 20 is urged toward the capstan 23 to cause the tape to be drawn past the heads 25 and 26. The tape between the guide 11 and the capstan 24 is maintained under tension due to the restraining action of the pressure roller 19. The roller 27 on the arm 28 is urged by a spring 34 to enter the secondary reservoir, inward movement of the arm 28 being limited by its engagement with a stop 35 on the under-side of the base plate. Due to the tape being maintained under tension, the roller 27 is prevented from entering the secondary reservoir. However, when the actuator 30 is energized to move the pinch roller 20 away from the capstan 24 and thereby stop forward feeding of the tape, the tape is no longer under tension and the roller 27 is enabled to enter the secondary reservoir and form a loop of tape therein. (This position of the roller 27 and the loop of the tape are indicated in broken lines on the drawing). The tape forming the loop is provided by reverse motion of the tape past the heads thus withdrawing tape from the main reservoir through the inlet throat 18. The pressure roller 19 prevents tape being drawn from the main reservoir through the outlet throat 17 when the loop in the secondary reservoir is formed. Thus when information is being read from the tape by the head 26 and an error in the recorded information is detected, the actuator 30 is energized to terminate feed of the tape and the roller 27 automatically causes reverse feeding of that part of the tape in which the error occurred. Subsequent de-energization of the actuator causes forward feeding to be resumed and the loop is withdrawn from the secondary reservoir, thereby allowing the information to be re-recorded on that part of the tape.

It will be appreciated that every time the forward feed is terminated by moving the pinch roller away from the capstan, the tape is automatically fed in reverse by an amount determined by the movement of the roller 27 from its normal position as shown in the drawing to its loop forming position in which it engages the stop. However when recording a number of blocks of information at spaced intervals of time it may be inconvenient to have the tape fed in reverse after recording each block of information. In order to selectively prevent reverse feeding of the tape a brake may be provided which grips the tape immediately the pinch roller is disengaged or braking may be provided by partially energizing the actuator so that the pinch roller engages the capstan with a force insufficient to feed the tape but sufficient to overcome the spring force acting on the roller 27. Thus the tape is lightly gripped between the pinch roller and the capstan and is maintained under tension.

Instead of providing the roller 27 mounted on the arm 28 to form the loop of tape of determined length, a vacuum reservoir may be provided to which negative air pressure is continually applied to produce a loop in the tape following the walls of the reservoir when the pinch roller 20 is moved away from the capstan roller 24.

While a tape drive arrangement for use with a cassette has been described, the reverse feeding arrangement could also be used for tape which is fed from a feed reel and then wound on to a take-up reel provided that when the capstan is inoperative to engage the tape, the tape can be drawn backwards from the take-up reel more readily than from the feed reel.

I claim:

1. Magnetic tape apparatus including an endless web of record medium; a cassette to contain a major part of the web, the cassette having an entry and an exit for the web; means for driving a minor part of the web over a path outside the cassette between the entry and the exit, the drive means including a capstan and a pinch roller disposed respectively on opposite sides of the web, means for urging the punch roller towards the capstan to impart a drive to the web in a forward direction; an electromagnetic actuator selectively operable to disable the drive by moving the pinch roller away from the capstan; a brake arranged to act continuously on a web on the path between the exit and the drive means to apply a braking force to the web to maintain tension on that part of the web between the brake and the drive means only while the drive is not disabled; loop forming means positioned between the brake and the drive means including a roller abutting the web, an arm carrying the roller and a spring acting on the arm to cause the arm to move the roller across the path of the web to form a loop in the web only if said tension on the web is released; and at least one transducer disposed adjacent the web between the drive and the loop forming means whereby upon operation of said disabling means the arm causes the roller to form said loop, the web being drawn in a reverse direction past the transducer by the formation of the loop.

2. Apparatus as claimed in claim 1 including a base plate; and a pivot on the base plate, said arm being mounted on the pivot so that said motion of the roller across the path of the web is arcuate; and further including a stop on the base plate positioned to determine the extent of the movement of the arm whereby said reverse movement of the web past the transducer is of a predetermined distance.

* * * * *